Aug. 28, 1928.
M. H. HANSEN
SCALE MECHANISM
Filed July 7, 1923
1,682,506
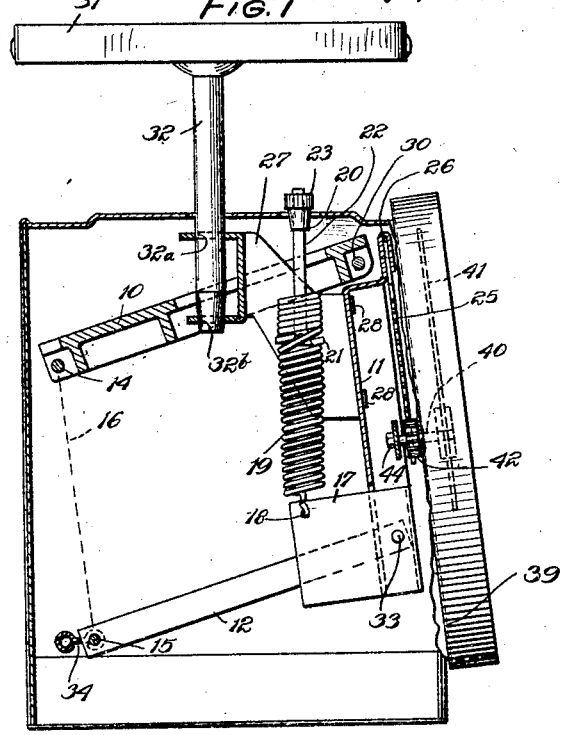
FIG. 1
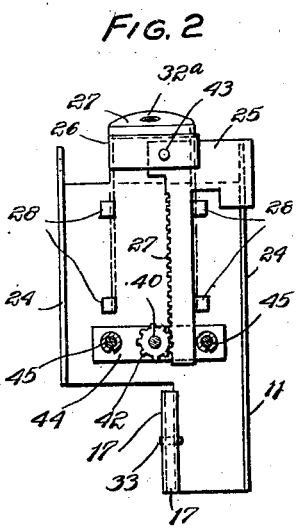
FIG. 2
FIG. 3
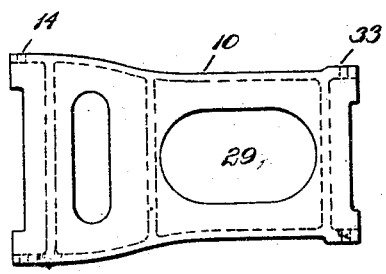
FIG. 4
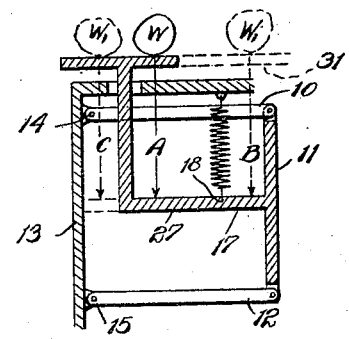
FIG. 5
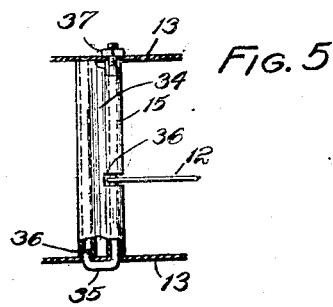
Inventor
Marius H. Hansen
By Chindahl Parker Carlson
Attys Patented Aug. 28, 1928.

1,682,506

UNITED STATES PATENT OFFICE.

MARIUS H. HANSEN, OF CHICAGO, ILLINOIS, ASSIGNOR TO HANSON BROTHERS SCALE COMPANY, OF CHICAGO, ILLINOIS, A CORPORATION OF ILLINOIS.

SCALE MECHANISM.

Application filed July 7, 1923. Serial No. 649,983.

This invention relates generally to a scale mechanism and more particularly to the type having a tension spring therein.

In scales of this type it is desirable to have a face inclined to the vertical and usually such an arrangement requires additional mechanism.

One object of my invention is to provide a substantial scale having an inclined face with a minimum of working elements.

Another object is to provide a mechanism designed to resist torsional effects from an unbalanced load.

Still another object is to connect to a single member of the mechanism, all the moving parts.

Another feature of my invention is the provision of a registering needle having a straight rack and pinion engagement in substantially unchanging relation.

Another object is to provide a scale in which lost motion can be permitted without affecting the accuracy of the scale.

A further object of the invention is the provision of a construction which keeps the lost motion always in the same direction.

Scales of this type usually employ an arrangement of members in the form of a parallelogram. Various means have been utilized to effect a registration of the weight and to connect the scale pan and the spring to the mechanism. In my invention I have combined these parts in such a manner that they all operate from a single member of the parallelogram. This permits a design for the member specially adapted for economical manufacture from pressed sheet steel, the required form giving rigidity. In conjunction with this a rigid cast member in the parallelogram keeps the whole free from torsion and permits the third member to be a single strip free from torsional effect, the fourth member being fixed and a part of the casing or frame.

Another feature is the angle of fixation for the parallelogram. Since an inclined face is desired, I have established the fixed member of the parallelogram parallel to the dial face. Thus the opposite member of the parallelogram is always parallel to the face. The angularity of the parallelogram at different loads merely changes the distance between the face and this member. By placing the straight rack on this parallel member and using a wide pinion on the registering needle, a simple and efficient connection is made for registration.

In the manufacture of scales of this type, economy, simplicity, accuracy, and utility are the leading features to be attained. In my invention I have provided a construction to satisfy all these requirements as will more fully appear hereinafter.

In the drawings, Fig. 1 is a general cross section view showing the scale mechanism. Fig. 2 is a view of the front member. Fig. 3 is a plan view of the top member. Fig. 4 represents a scale embodying my invention and is also a graphical representation of the forces existing in a mechanism under different conditions of use, imaginary extensions of the parts being shown for this purpose. Fig. 5 is a detail showing the manner of attaching the mechanism to the casing.

In expounding my invention I choose first to describe somewhat in detail the scale shown in Fig. 1 as this is typical of a commercially practical scale of the type to which my invention applies. The principles embraced by my invention are directed to making a more accurate device of parts which are mechanically simple and easily constructed.

The scale comprises generally the paralellogram arrangement of the top member 10, the front member 11, the bottom member 12 and the casing 13. The members 10 and 12 are pivoted to the casing at 14 and 15, respectively, whereby the casing becomes the fixed member of the parallelogram, said member being hereinafter referred to as the fixed member 16 and represented by the dotted line designated 16. The casing 13 is economically made of sheet material to lessen the weight of the whole and yet to furnish the required strength for the capacity of the scale without impairing its accuracy. However, my invention relates to a scale mechanism which may be supported by any fixed frame or member, instead of the casing 13. In connection with this feature of accuracy there is an important relation of the scale mechanism as I have designed it to the casing or support to maintain the accuracy.

The member 11 has the extension 17 thereon extending inwardly of the parallelogram. At the point 18 the spring 19 is attached, extending upwardly where it is held by the casing 13 at 20. In attaching the spring at the upper end a disk 21 is adjustably held between adjacent coils in the spring and a link 22 centrally held by the disk has a thumb screw 23 engaging the casing 13. The disk 21 is capable of being screwed into the spring to vary the number of coils which are active in the scale, and the screw 23 is capable of adjustment to vary the tension of these coils.

The front member 11 is pressed from cold rolled steel having the general form of a channel iron with the sides 24, the top having the bent piece 26 in which is pivoted the rack member 25. To the rear of the front member, extending back and upwardly, is the bracket 27 of sheet material, fastened to the front member by the bent ears 28. The top member 10 is a cast piece having the form shown in Fig. 3 with the opening 29 through which the bracket member 27 passes upwardly. Members 10 and 11 are pivoted together at 30. The construction of each, by the width of the members, is a guard to resist torsion effects which tend to occur by placing the weight upon different parts of the scale pan 31 supported by the post 32 in tapered holes 32$^a$ and 32$^b$ in the bracket 27.

The bottom member 12 is a simple link connected to the front member at 33 and to the fixed member 16 at 15 as shown in Fig. 5. The pivot 15 is a rod extending through the support 34 which has two parallel circular channels therein, made by rolling the edges of a single strip of material. The rod 15 is U-shaped at one end 35 to form a locking leg 36, which holds the support 34 rigid to the frame. At the other end of 15 are threads and a nut 37 therefor which secure it to the casing. A slot 38 in the support 34 permits the engagement of member 12 by the pivot 15.

Having described the general character of the essential members, I now wish to show the relation of the same to the design, the accuracy and the general purposes of my invention. This is best done by reference to the diagram entitled Fig. 4 which represents a scale having the member 11 with a single extension 17—27 thereon, this being a combinded representation of the members 11, 17 and 27—32—31 of Fig. 1. The whole functions as a rigid member in stable equilibrium, assumed as pivoted about the point 18 in the plane of the drawing. Any object W applied on the scale pan 31 is effective on the rigid member 11 upon a line through the center of gravity of the object W.

In Fig. 4 the pan is shown as having an imaginary extension for the purpose of explanation only. In operation of the scale the forces acting on member 11 bring it to stable equilibrium. According to its position on the pan the force may be applied anywhere as A, B, or C. A and C are upon the same side of the point 18 while B is on the opposite side, the direction being taken substantially along the plane of the parallelogram. It is thus seen that weight at A or C tends to rotate the member 11 counter-clockwise, while the weight at B tends to rotate it clock-wise. When the weight is at B, the member 10 is in tension and 12 in compression. When the weight is at A or C the member 10 is in compression and 12 is in tension. Consequently a shift of the weight on the scale pan such that the center of gravity changes from one to the other side of point 18 causes a shift of the forces in the parallelogram. For reasons of economy in manufacture, there is always a certain amount of lost motion or slack in a scale of this class. It is my object to keep this slack always in one direction. It is obvious that a shift of the center of gravity as described will change the slack in the mechanism so that inaccuracies of registration will result. And in addition, such a shift will register on the dial any buckling or flexure of the casing or supports which form the fixed member 16 of the parallelogram. Therefore, since the flexure is always in the same direction in a scale embodying my invention, a lighter weight material may be used for the casing. In the arrangement which I have used, I desire to have the center of gravity back of the point 10, thus keeping member 12 in tension and 10 in compression. This permits the use of a strip for member 12 as there will be no occasion for it to buckle. Likewise the form of the member 10, as made to resist the torsional effect, provides a substantial structure to resist compression.

The farther point C is moved from 18 the greater becomes the tension and compression in the members 12 and 10. As the width of the scale pan will allow some deviation in the locus of the center of gravity the relative change will be lessened the farther the point C of application is removed from 18. Therefore it is desirable that the post 32 be carried as far back on the scale as is conveniently possible, and the point 18 as far front as is conveniently possible. The embodiment shown in Fig. 1 has a scale pan which does not overhang the back of the casing. The limitations in this respect are for utility and in no way limit the invention.

Other features of my invention relate to the positioning of the parallelogram in the casing. The fixed member 16 is at an angle to the vertical, which angle is that desired for the face 39 of the scale. The members 16, 11 and 39 then become parallel at all times and the distance between members 11 and 39 varies according to the angularity of the parallelogram. The dial 39 has a central opening for pin 40 having needle 41 and the pinion 42 thereon. The rack 27 is carried by member 11 parallel to it and pivoted to it at 43. In hanging freely on its pivot 43 the rack 25 moves to the left in Fig. 2 or against the pinion 42, which has a substantial width to accommodate the changing distance between the members 11 and 39. A bar 44 attached to, or a part of, the casing 13 receives the pin 40 as a bearing therefor and also the screws 45 which hold the face 39 in place. One of the screws 45 serves as a guide to prevent the rack 27 from falling away from the pinion 42.

The principle upon which the scale is built is capable of many variations for different purposes and these will naturally occur to those skilled in the art. While I have referred in my drawings to various members as the front, bottom and top members, and to certain directions as front and rear, these terms are in no way to be construed as limiting my invention. The scales shown in the drawings are but one arrangement according to my invention and are shown for the purpose of illustration only. It is to be understood that other forms can be built which will exemplify my invention in a similarly precise manner, so that I desire the invention to be limited only by the appended claims.

I claim as my invention:

1. A scale mechanism having, in combination, a casing, four members arranged as a parallelogram, one of said members being fixed to the casing, the opposite being a rigid member and having a projection thereon, carrying a scale pan, the rigid member also having a spring extending to the casing, said spring being adapted to resist a weight on the scale pan, the position of the spring being such that the center of gravity of the weight when placed approximately centrally on the scale pan remains normally on the same side of the spring in the direction of the plane of the parallelogram.

2. A scale mechanism having, in combination, a casing, four members arranged as a parallelogram, one of said members being rigid with the casing, the opposite member having rigid means carrying a scale pan and other rigid means held by a tension device to the casing, the position of the tension force when the weight is placed approximately centrally on the scale pan being always on the same side of the center of gravity of the weight on the scale pan in the direction of the plane of the parallelogram.

3. A scale mechanism having, in combination, a casing, a rigid member, a scale pan on said member adapted to receive a weight, tension means between said member and the casing to resist the weight, a compression resisting link from one end of the rigid member to the casing, and a tension resisting link from the other end of the rigid member to the casing, the scale pan being adapted when the weight is positioned approximately centrally on the scale pan to maintain the center of gravity of the weight thereon on one side of the line of action of the tension means.

4. A scale mechanism having, in combination, a casing, a rigid member, a scale pan on said rigid member adapted to receive a weight, resistance means between said member and the casing adapted to oppose the weight on the scale pan, a compression link from one end of the rigid member to the casing, and a tension link from the other end of the rigid member to the casing, the scale pan extending mainly to one side of the resistance means so that in normal use it will maintain the center of gravity of the weight thereon on one side of the line of action of the tension means in the direction of the links.

5. A scale mechanism having, in combination, a frame, a rigid member, a scale pan on said rigid member adapted to receive a weight, resistance means between the frame and the rigid member adapted to oppose the weight on the scale pan, a compression link from one end of the rigid member to the frame, and a tension link from the other end of the rigid member to the frame, the weight when positioned over the center of the scale pan having its line of application to the rigid member always on the same side in the direction of the links of the line of application of the resisting means, whereby said links are properly held in tension and compression as required.

6. A scale mechanism having, in combination, a fixed member, a rigid member, a scale pan on said rigid member, adapted to receive a weight, resistance means between said fixed and rigid members adapted to oppose the weight, parallel links from said rigid member to the fixed member, the weight when positioned mainly over the center of the scale pan having its line of application to the rigid member always on the same side of the resisting means in the direction of the links, whereby said links are always in tension or compression as the case may be.

7. A scale mechanism having, in combination, a fixed member, a rigid member, a scale pan on said rigid member, adapted to receive a weight, resistance means between said fixed and rigid members adapted to oppose the weight, links from said rigid member to the fixed member, the weight when positioned mainly over the center of the scale pan having its line of application to the rigid member always on the same side of the resisting means in the direction of the links, whereby said links are always in tension or compression as the case may be.

8. A scale mechanism having, in combination, a fixed member, a rigid member, a scale pan on said rigid member adapted to receive a weight, resistance means between the rigid and the fixed members, adapted to oppose the weight, two links from said rigid member to the fixed member adapted to stabilize the rigid member, said links being adapted for tension or compression, the rigid member being held in stable equilibrium by the forces of the weight, the resisting means and the links, the relative directions of said forces about a fixed center remaining unchanged by shifting the weight on the scale pan so long as the weight is positioned approximately centrally on the scale pan.

9. A scale mechanism comprising a fixed frame, members arranged as a parallelogram, one of said members being fixed to the frame, the opposite member being a rigid member, the other members being links, resisting means acting on the rigid member from the frame in a substantially vertical direction, a scale pan carried by the rigid member having its area substantially offset along the direction of the link members from the line of action of the resisting means, whereby in the use of the scale the direction of the forces in the parallelogram remains unchanged by the shifting of the weight on the scale pan so long as the weight is positioned approximately centrally on the scale pan.

10. In a scale mechanism having, in combination, members linked together, a scale pan to receive a weight and resisting means to oppose the weight, a lateral extension on one of said members to receive either one of the forces of the resisting means and the weight on the scale pan, pivotal connections between the links having some lost motion therebetween, the lateral extension serving to create distance between the lines of said forces, said distance remaining positive in one direction by shifting the weight centrally on the scale pan, whereby the lost motion in the linked members is maintained in the same direction.

11. A scale mechanism having a casing, four members in said casing pivoted as a parallelogram, the first of said members being fixed to the casing, an adjacent and second member being a member with substantial width and thickness to resist torsion and compression and having an opening therein, the next and third member being a rigid member having a substantial width and thickness to resist torsion, the fourth member being a single strip linking the first and third members adapted to resist tension, a bracket on the rigid member, extending rearwardly, having holes therein in vertical alinement, a scale pan and post thereon adapted to fit said holes in the bracket, a rearwardly extending ear on the rigid member, a tension spring extending from the ear to the casing in a substantially vertical direction, the bracket and the spring passing through the openings of the second member, and means on the rigid member to cause indication of the vertical displacement thereof by a weight on the scale pan.

12. In a scale having a scale pan and a weight resister therein, a parallelogram linkage for said scale, said linkage having a member in the parallelogram adapted primarily for tension, said pan and weight resister being so related to the linkage that said member is under tension when the weight is positioned on the scale pan with its center of gravity to the same side of the weight resister as the center of said pan.

13. In a scale having a scale mechanism of the class described including a rigid member linked for motion substantially parallel to itself in different positions, a rack on said member parallel thereto adapted to engage a pinion, a bracket secured to said member by bent ears passing therethrough, an ear on said member being a part thereof turned at an angle to the plane of the member, and channel sides on said member being integral therewith, the member being substantially a sheet of steel, struck out and turned to the form described.

In testimony whereof, I have hereunto affixed my signature.

MARIUS H. HANSEN.